US012163669B2

United States Patent

Neal et al.

(12) United States Patent
(10) Patent No.: US 12,163,669 B2
(45) Date of Patent: Dec. 10, 2024

(54) COOKING APPLIANCE WITH ELECTRICAL COOKING ELEMENT DRYING OPERATIONS

(71) Applicant: Midea Group Co., Ltd., Foshan (CN)

(72) Inventors: Vern A. Neal, Louisville, KY (US); Felix Conde Zelocuatecatl, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 760 days.

(21) Appl. No.: 17/349,460

(22) Filed: Jun. 16, 2021

(65) Prior Publication Data

US 2022/0404024 A1 Dec. 22, 2022

(51) Int. Cl.
*F24C 7/08* (2006.01)
*F24C 7/06* (2006.01)
*F26B 3/34* (2006.01)

(52) U.S. Cl.
CPC ................ *F24C 7/088* (2013.01); *F24C 7/06* (2013.01); *F26B 3/34* (2013.01)

(58) Field of Classification Search
CPC ... H02H 3/33; H05B 1/02; H05B 3/44; H05B 1/0283; H05B 2203/014; H05B 2203/021; F24C 7/06; F24C 7/08; F26B 3/34
USPC .......................................................... 219/393
See application file for complete search history.

(56) References Cited

U.S. PATENT DOCUMENTS 3,970,817 A * 7/1976 Boyd ........................ H05B 3/48 219/544
4,465,924 A * 8/1984 Payne .................... H02H 7/226 219/508
5,039,842 A * 8/1991 Kochajda ................ H02H 3/16 361/87
6,958,463 B1 10/2005 Kochman et al.
7,209,651 B1 4/2007 Knoeppel et al.
7,378,617 B1 * 5/2008 Brockman .............. F24C 7/087 99/330
9,377,342 B2 6/2016 Chaudhry
10,117,292 B2 10/2018 Tiwana
10,222,290 B2 3/2019 Yunker et al.
2020/0092953 A1 3/2020 Kirchoff et al.
2020/0275527 A1 8/2020 Sakamoto

OTHER PUBLICATIONS

Electric Heating Appliances, Standard for Safety, Underwriters Laboratories Inc., Nov. 17, 2005.
Watlow, John Pape, Dealing with moisture inside electric heaters, Mar. 15, 2008.

* cited by examiner

*Primary Examiner* — Sang Y Paik
(74) *Attorney, Agent, or Firm* — Gray Ice Higdon

(57) ABSTRACT

A cooking appliance and method of operation thereof in which cooking element drying operations are implemented to drive moisture out of the electrically-insulative material in a sheathed electrical cooking element. In many instances, the cooking element drying operations are of relatively short duration and/or include multiple cycles to drive moisture out of the electrically-insulative material without generating sufficient leakage current to cause a GFCI trip, and in some instances, while maintaining a surface temperature of the cooking element below a temperature that could cause a skin burn to occur and/or for items in contact with the cooking element to be damaged.

20 Claims, 5 Drawing Sheets

COOKING APPLIANCE WITH ELECTRICAL COOKING ELEMENT DRYING OPERATIONS

BACKGROUND

Cooking appliances such as cooktops, ranges, ovens, etc., may be powered by various types of heating or cooking elements, with electrical cooking elements and gas burners being among the most common. Electrical cooking elements are commonly constructed as sheathed cooking elements, which utilize a resistive heater core that extends through a grounded sheath and generates heat when electrical current is passed through the core. Electrical insulation between the core and the sheath is generally provided by an electrically-insulative material that is housed within the sheath and that while providing electrical insulation also provides thermal conductivity to convey the heat generated by the core to the sheath.

Some sheathed cooking elements utilize an electrically-insulative powder such as magnesium oxide (MgO) for the electrically-insulative material; however, it has been found that MgO powder naturally absorbs moisture from the ambient environment, and this moisture can provide a path of conductivity from the heater core through the MgO powder to the grounded sheath, and as a result, can cause some portion of the electrical current supplied to the heater core to leak to ground through this path of conductivity.

In many applications, this absorption is not problematic due to the fact that whenever a sheathed cooking element is energized and heated up, moisture is naturally driven out of the cooking element and the leakage current drops nearly to zero. However, due to more recent changes in housing codes, cooking appliances are increasingly being used in electrical circuits that are protected by “ground fault” (GFCI) circuit breakers, and when one of the aforementioned sheathed cooking elements is energized in a circuit protected by a GFCI circuit breaker while a sufficient amount of moisture has been absorbed into the cooking element, the transient leakage current that is generated prior to the moisture being driven out of the cooking element may be sufficient in some circumstances to trip the GFCI circuit breaker, causing a “false” GFCI trip to occur, and requiring a consumer to reset the circuit breaker before restarting the cooking appliance. In some instances, the circuit breaker may trip and need to be reset multiple times until a sufficient amount of moisture has been driven out of the cooking element, leading to frustration and potentially an unnecessary service call.

Therefore, a need exists in the art for a manner of reducing the frequency of false GFCI trips associated with the use of sheathed cooking elements in a cooking appliance.

SUMMARY

The herein-described embodiments address these and other problems associated with the art by providing a cooking appliance and method of operation thereof in which cooking element drying operations are implemented to drive moisture out of the electrically-insulative material in a sheathed electrical cooking element. In many instances, the cooking element drying operations are of relatively short duration and/or include multiple cycles to drive moisture out of the electrically-insulative material without generating sufficient leakage current to cause a GFCI trip, and in some instances, while maintaining a surface temperature of the cooking element below a temperature that could cause a skin burn to occur and/or for items in contact with the cooking element to be damaged.

Therefore, consistent with one aspect of the invention, a cooking appliance may include a housing, a cooktop disposed on an upwardly facing surface of the housing, an oven cavity disposed within the housing, a plurality of cooktop electrical cooking elements disposed on the cooktop, each cooktop electrical cooking element including a heater core extending through a sheath and electrically insulated from the sheath by an electrically-insulative powder, a plurality of oven electrical cooking elements positioned to generate heat within the oven cavity, each oven electrical cooking element including a heater core extending through a sheath and electrically insulated from the sheath by an electrically-insulative powder, and a controller coupled to the plurality of cooktop electrical cooking elements and the plurality of oven electrical cooking elements. The controller may be configured to selectively activate one or more of the plurality of cooktop electrical cooking elements during a cooktop cooking operation and to selectively activate one or more of the plurality of oven electrical cooking elements during an oven cooking operation, and the controller may further be configured to perform a cooking element drying operation that sequentially and individually activates each of the plurality of cooktop electrical cooking elements and the plurality of oven electrical cooking elements one or more times each while maintaining a surface temperature of each of the plurality of cooktop electrical cooking elements and plurality of oven electrical cooking elements below a burning temperature threshold to drive moisture out of each of the plurality of cooktop electrical cooking elements and the plurality of oven electrical cooking elements.

Consistent with another aspect of the invention, a cooking appliance may include an electrical cooking element configured to generate heat in response to electrical current, the electrical cooking element including a heater core extending through a sheath and electrically insulated from the sheath by an electrically-insulative material, and a controller coupled to the electrical cooking element and configured to activate the electrical cooking element during a cooking operation to generate heat. The controller may further be configured to perform a cooking element drying operation that activates the electrical cooking element to drive moisture out of the electrically-insulative material of the electrical cooking element.

In some embodiments, the controller is configured to perform the cooking element drying operation by cycling the electrical cooking element one or more times while maintaining a surface temperature of the electrical cooking element below a burning threshold temperature. Further, in some embodiments, the burning threshold temperature is less than about 84 degrees Celsius. Also, in some embodiments, the controller is configured to perform the cooking element drying operation by cycling the electrical cooking element for less than about one second per cycle.

Further, in some embodiments, the controller is configured to activate the electrical cooking element during a cooking operation at a first voltage, and to perform the cooking element drying operation by activating the electrical cooking element at a second voltage that is lower than the first voltage. In some embodiments, the controller is configured to perform the cooking element drying operation by activating the electrical cooking element with a high frequency duty cycle to reduce an effective voltage supplied to the electrical cooking element during the cooking element drying operation.

Also, in some embodiments, the electrical cooking element is a first electrical cooking element among a plurality of electrical cooking elements, and the controller is configured to perform the cooking element drying operation by sequentially cycling each of the plurality of electrical cooking elements one or more times each. In some embodiments, the controller is configured to individually activate each of the plurality of electrical cooking elements by itself when sequentially cycling each of the plurality of electrical cooking elements one or more times each. Further, in some embodiments, the controller is configured to control activation of the electrical cooking element during the cooking element drying operation without sensing leakage current in the electrical cooking element.

In some embodiments, the controller is configured to perform the cooking element drying operation in response to initial power on of the cooking appliance upon installation. Further, in some embodiments, the controller is configured to perform the cooking element drying operation in response to user input. Also, in some embodiments, the user input is received through a service menu. In addition, in some embodiments, the controller is configured to perform the cooking element drying operation at regular time intervals to inhibit moisture build-up in the electrically-insulative material of the electrical cooking element.

In some embodiments, the controller is configured to monitor usage of the electrical cooking element during use of the cooking appliance, and the controller is configured to perform the cooking element drying operation in response to the monitored usage. In addition, in some embodiments, the controller is configured to perform the cooking element drying operation in response to the monitored usage indicating non-use of the electrical cooking element meeting a predetermined threshold.

Also, in some embodiments, the electrical cooking element is a first electrical cooking element among a plurality of electrical cooking elements, the controller is configured to monitor usage of each of the plurality of electrical cooking elements during use of the cooking appliance, and the controller is configured to perform the cooking element drying operation for only a subset of the plurality of electrical cooking elements in response to the monitored usage. In addition, in some embodiments, the electrically-insulative material includes a magnesium oxide powder.

In addition, some embodiments may also include a housing and a cooktop disposed in the housing, and the electrical cooking element is a cooktop electrical cooking element disposed on the cooktop. Some embodiments may also include a housing and an oven cavity, and the electrical cooking element is an oven electrical cooking element configured to supply heat to the oven cavity.

Consistent with another aspect of the invention, a method of operating a cooking appliance may include monitoring usage of an electrical cooking element during use of the cooking appliance, the electrical cooking element configured to generate heat in response to electrical current and including a heater core extending through a sheath and electrically insulated from the sheath by an electrically-insulative material, and performing a cooking element drying operation that activates the electrical cooking element to drive moisture out of the electrically-insulative material of the electrical cooking element in response to the monitored usage.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
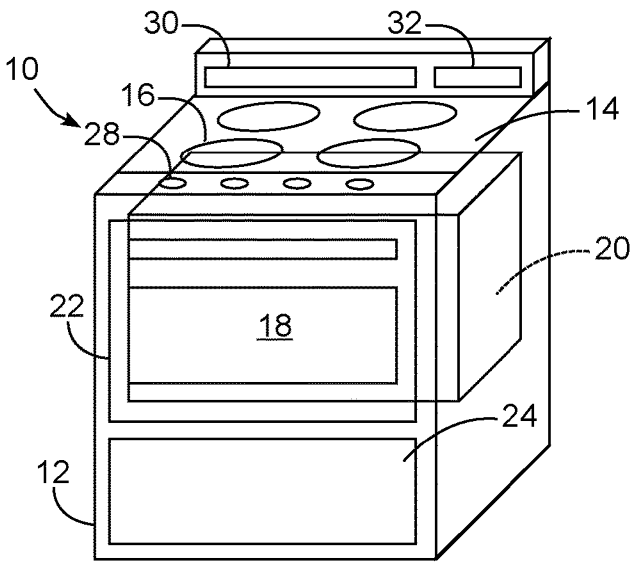
FIG. 1 is a perspective view of a cooking appliance consistent with some embodiments of the invention.

Turning now to the drawings, wherein like numbers denote like parts throughout the several views, FIG. 1 illustrates an example cooking appliance 10 in which the various technologies and techniques described herein may be implemented. Cooking appliance 10 is a residential-type range, and as such includes a housing 12, a stovetop or cooktop 14 including a plurality of burners 16, and an oven 18 defining an oven or cooking cavity 20 accessed via an oven door 22. Cooking appliance 10 may also include a storage drawer 24 in some embodiments, or in other embodiments, may include a second oven. Various cooking elements (not shown in FIG. 1) may also be incorporated into cooking appliance 10 for cooking food in oven 18, e.g., one or more electric or gas cooking elements.

Cooking appliance 10 may also include various user interface devices, including, for example, control knobs 28 for controlling burners 16, a control panel 30 for controlling oven 18 and/or burners 16, and a display 32 for providing visual feedback as to the activation state of the cooking appliance. It will be appreciated that cooking appliance 10 may include various types of user controls in other embodiments, including various combinations of switches, buttons, knobs and/or sliders, typically disposed at the rear or front (or both) of the cooking appliance. Further, in some embodiments, one or more touch screens may be employed for interaction with a user. As such, in some embodiments, display 32 may be touch sensitive to receive user input in addition to displaying status information and/or otherwise interacting with a user. In still other embodiments, cooking appliance 10 may be controllable remotely, e.g., via a smartphone, tablet, personal digital assistant or other networked computing device, e.g., using a web interface or a dedicated app.

Display 32 may also vary in different embodiments, and may include individual indicators, segmented alphanumeric displays, and/or dot matrix displays, and may be based on various types of display technologies, including LEDs, vacuum fluorescent displays, incandescent lights, etc. Further, in some embodiments audio feedback may be provided to a user via one or more speakers, and in some embodiments, user input may be received via a spoken or gesture-based interface.

As noted above, cooking appliance 10 of FIG. 1 is a range, which combines both a stovetop and one or more ovens, and which in some embodiments may be a standalone or drop-in type of range. In other embodiments, however, cooking appliance 10 may be another type of cooking appliance, e.g., a wall mount or freestanding oven, or a stovetop or cooktop. In general, a cooking appliance consistent with the invention may be considered to include any residential-type appliance including a housing and one or more electrical cooking elements disposed therein and configured to generate energy for cooking food.

In turn, a cooking element may be considered to include practically any type of energy-producing element used in residential applications in connection with cooking food, e.g., employing various cooking technologies such as electric, gas, light, microwaves, induction, convection, radiation, etc. In the case of an oven, for example, one or more cooking elements therein may be gas, electric, light, or microwave cooking elements in some embodiments, while in the case of a stovetop, one or more cooking elements therein may be gas, electric, or inductive cooking elements in some embodiments. Further, it will be appreciated that any number of cooking elements may be provided in a cooking appliance (including multiple cooking elements for performing different types of cooking cycles such as baking or broiling, including multiple bake and/or multiple broiler cooking elements, as well as one or more convection cooking elements), and that multiple types of cooking elements may be combined in some embodiments, e.g., combinations of microwave and light cooking elements in some oven embodiments. In the illustrated embodiment, at least one cooking element is a sheathed electrical cooking element, and it will be appreciated that in some embodiments, all cooking elements may be sheathed electrical cooking elements, while in other embodiments, different cooking technologies may be combined, e.g., an oven with sheathed electrical cooking elements combined with a cooktop using gas burners or inductive cooking elements (among others).

Figure 2:
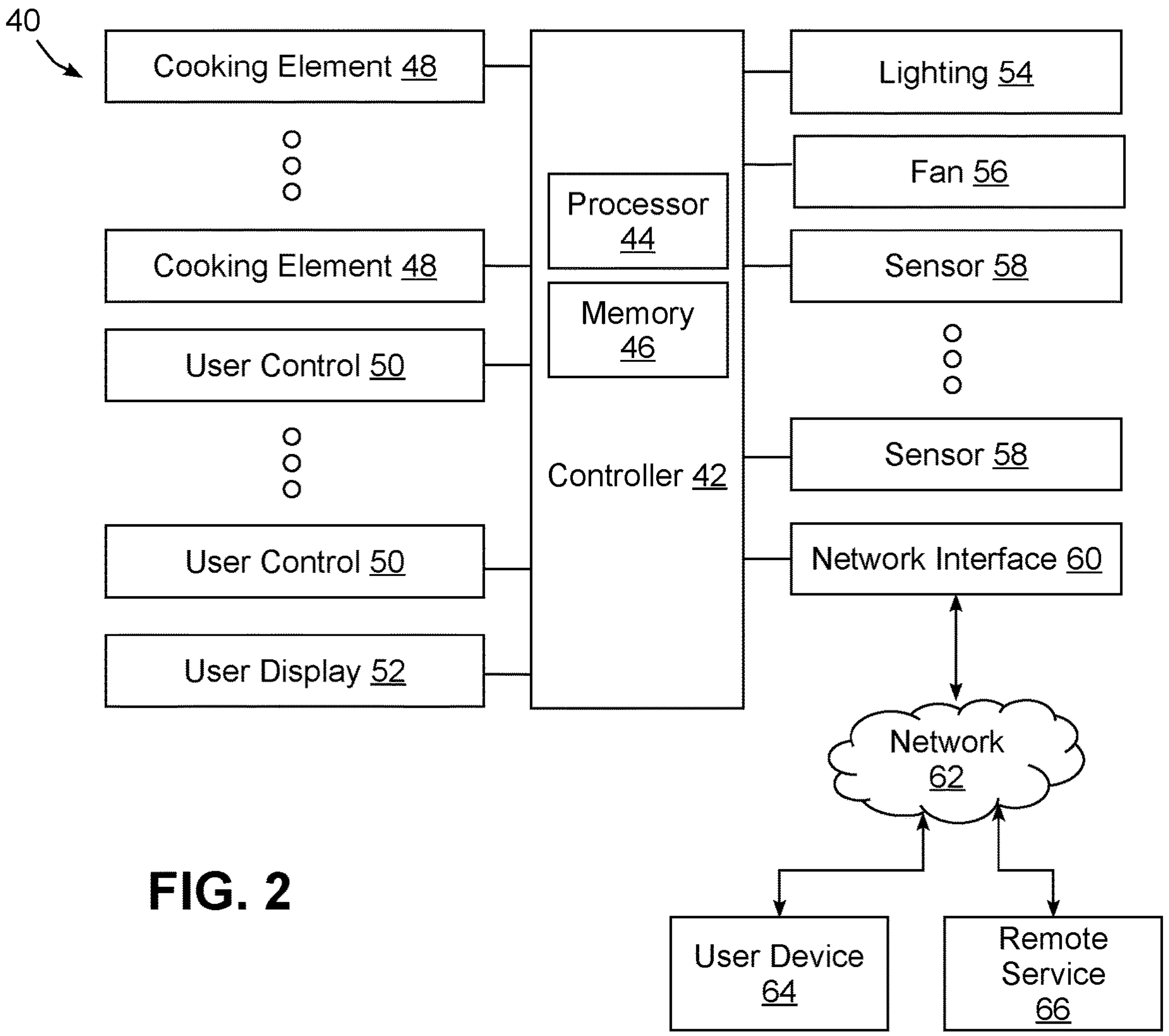
FIG. 2 is a block diagram of an example control system for a cooking appliance consistent with some embodiments of the invention.

A cooking appliance consistent with the invention also generally includes one or more controllers configured to control the cooking elements and otherwise perform cooking operations at the direction of a user, e.g., cooktop cooking operations when using cooktop cooking elements and oven cooking operations when using oven cooking elements, each of which involving the activation of one or more cooking elements to generate heat used in cooking. FIG. 2, for example, illustrates an example embodiment of a cooking appliance 40 including a controller 42 that receives inputs from a number of components and drives a number of components in response thereto. Controller 42 may, for example, include one or more processors 44 and a memory 46 within which may be stored program code for execution by the one or more processors. The memory may be embedded in controller 42, but may also be considered to include volatile and/or non-volatile memories, cache memories, flash memories, programmable read-only memories, read-only memories, etc., as well as memory storage physically located elsewhere from controller 42, e.g., in a mass storage device or on a remote computer interfaced with controller 42.

As shown in FIG. 2, controller 42 may be interfaced with various components, including various cooking elements 48 used for cooking food (e.g., various combinations of gas, electric, inductive, light, microwave, light cooking elements, among others), one or more user controls 50 for receiving user input (e.g., various combinations of switches, knobs, buttons, sliders, touchscreens or touch-sensitive displays, microphones or audio input devices, image capture devices, etc.), and a user display 52 (including various indicators, graphical displays, textual displays, speakers, etc.), as well as various additional components suitable for use in a cooking appliance, e.g., lighting 54 and/or one or more fans 56 (e.g., convection fans, cooling fans, etc.), among others.

Controller 42 may also be interfaced with various sensors 58 located to sense environmental conditions inside of and/or external to cooking appliance 40, e.g., one or more temperature sensors, humidity sensors, air quality sensors, smoke sensors, carbon monoxide sensors, odor sensors and/or electronic nose sensors, among others. Such sensors may be internal or external to cooking appliance 40, and may be coupled wirelessly to controller 42 in some embodiments.

In some embodiments, controller 42 may also be coupled to one or more network interfaces 60, e.g., for interfacing with external devices via wired and/or wireless networks such as Ethernet, Wi-Fi, Bluetooth, NFC, cellular and other suitable networks, collectively represented in FIG. 2 at 62. Network 62 may incorporate in some embodiments a home automation network, and various communication protocols may be supported, including various types of home automation communication protocols. In other embodiments, other wireless protocols, e.g., Wi-Fi or Bluetooth, may be used. In some embodiments, cooking appliance 40 may be interfaced with one or more user devices 64 over network 62, e.g., computers, tablets, smart phones, wearable devices, etc., and through which cooking appliance 40 may be controlled and/or cooking appliance 40 may provide user feedback. Further, in some embodiments, cooking appliance 40 may be interfaced with one or more remote services 66, e.g., cloud-based services, remote servers.

In some embodiments, controller 42 may operate under the control of an operating system and may execute or otherwise rely upon various computer software applications, components, programs, objects, modules, data structures, etc. In addition, controller 42 may also incorporate hardware logic to implement some or all of the functionality disclosed herein. Further, in some embodiments, the sequences of operations performed by controller 42 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

Numerous variations and modifications to the cooking appliances illustrated in FIGS. 1-2 will be apparent to one of ordinary skill in the art, as will become apparent from the description below. Therefore, the invention is not limited to the specific implementations discussed herein.

Electrical Cooking Element Drying Operations

As discussed above, a sheathed cooking element, which utilizes a resistive heater core that extends through a grounded sheath and is insulated therefrom by an electrically-insulative material, may be prone to absorbing moisture from the ambient environment. The amount of moisture that is absorbed may vary based upon the temperature and/or humidity of the ambient environment, as well as the amount of time since the cooking element was used, since normal use of the cooking element to generate heat generally drives moisture out of the cooking element. This absorption may be especially prominent for brand new cooking appliances, which may be subject to widely varying environments during shipping and storage, as well as for cooking appliances that have not been used for some period of time, e.g., in the case of vacation homes or seasonal rentals.

Figure 3:
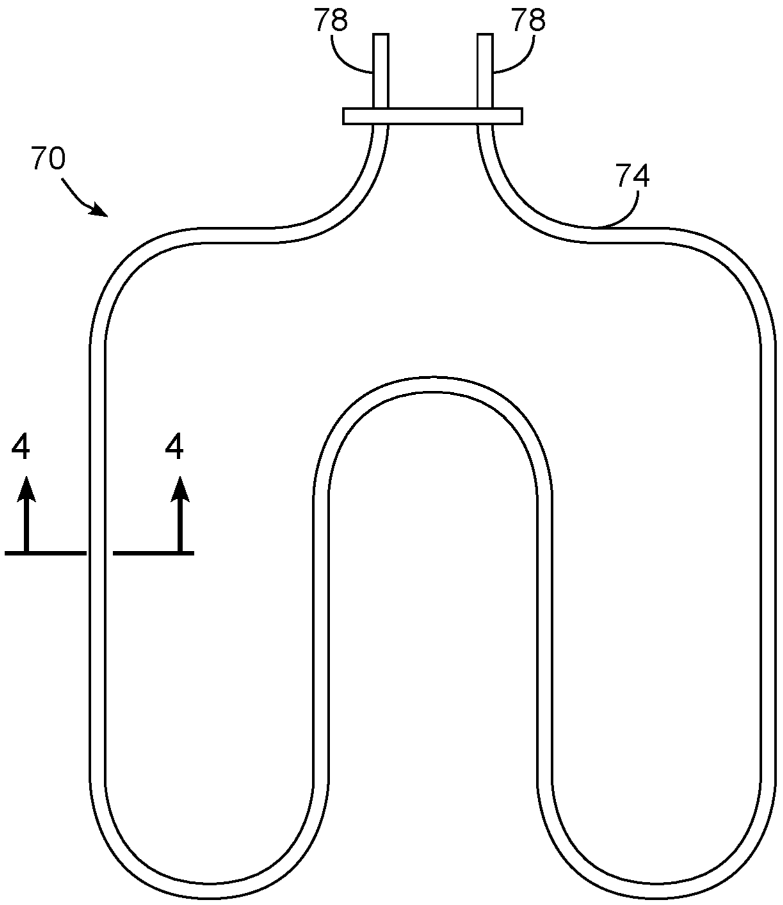
FIG. 3 is a top plan view of an example sheathed electrical cooking element used as an oven cooking element in the cooking appliance of FIG. 1 or the cooking appliance of FIG. 2.
Figure 4:
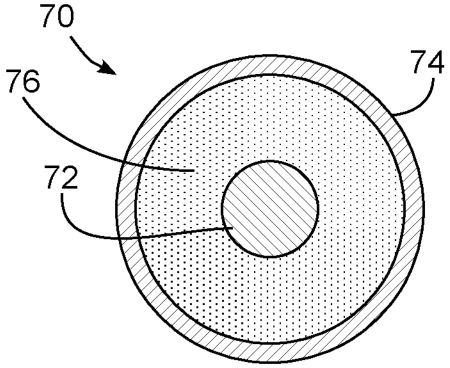
FIG. 4 is a cross-sectional view taken through lines 4-4 of FIG. 3.

FIGS. 3-4, for example, illustrate an example electrical cooking element 70 suitable for use as the bake or broil cooking element for an oven, including a heater core 72 that is housed within a sheath 74 and that is electrically insulated therefrom by an electrically-insulative material 76 that also provides thermal conductivity to convey the heat generated by core 72 to sheath 74. Core 72 may be formed of a resistive material such as NiCr and may be formed, for example, from one or more helix coils in some embodiments. Sheath 74 may be formed of an electrically conductive material such as a stainless steel alloy, and is generally grounded. A voltage supplied across a pair of connectors 78 may generate current through core 72 to generate heat.

The electrically-insulative material 76 in some embodiments may be an electrically-insulative powder such as magnesium oxide (MgO), although other materials that provide both electrical insulation and thermal conductivity may be used. MgO powder, in particular, is hygroscopic and naturally absorbs moisture from the ambient environment, and this moisture can provide a path of conductivity from core 72 through the MgO powder to the grounded sheath 74, and as a result, can cause some portion of the electrical current supplied to the heater core to leak to ground through this path of conductivity.

Figure 5:
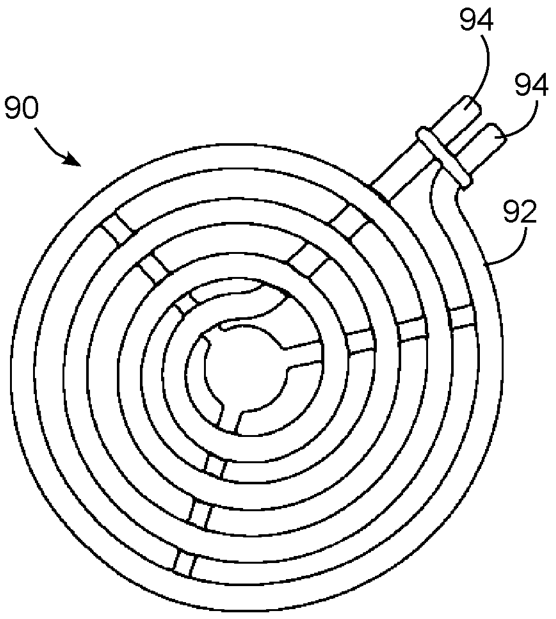
FIG. 5 is a top plan view of an example sheathed electrical cooking element used as a cooktop cooking element in the cooking appliance of FIG. 1 or the cooking appliance of FIG. 2.

FIG. 5 illustrates an example electrical cooking element 90 suitable for use as a cooktop cooking element, including a coiled sheath 92 that terminates in a pair of connectors 94. Similar to oven electrical cooking element 70 of FIGS. 3-4, cooktop electrical cooking element 90 includes a core and electrically-insulative material, e.g., in a similar arrangement to that illustrated in FIG. 4, and as such a cross-section of FIG. 5 is not included herein.

It will be appreciated that different materials, geometries, shapes, sizes, core configurations, etc. of electrical cooking elements may be used in other embodiments. As such, the invention is not limited to the specific embodiments illustrated in FIGS. 3-5, as will be appreciated by those of ordinary skill in the art having the benefit of the instant disclosure.

As also noted above, due to more recent changes in housing codes, cooking appliances are increasingly being used in electrical circuits that are protected by "ground fault" (GFCI) circuit breakers, and when one of the aforementioned sheathed cooking elements is energized in a circuit protected by a GFCI circuit breaker while a sufficient amount of moisture has been absorbed into the cooking element, the transient leakage current that is generated prior to the moisture being driven out of the cooking element may be sufficient in some circumstances to trip the GFCI circuit breaker, causing a "false" GFCI trip to occur, and requiring a consumer to reset the circuit breaker before restarting the cooking appliance. In some instances, the circuit breaker may even trip and need to be reset multiple times until a sufficient amount of moisture has been driven out of the cooking element, leading to consumer frustration and potentially an unnecessary service call.

Embodiments consistent with the invention, on the other hand, may implement cooking element drying operations to drive moisture out of the electrically-insulative material of an electrical cooking element. In this regard, a cooking element drying operation may be considered to be an operation performed by a cooking appliance that is separate from any cooking operation, and that temporarily activates an electrical cooking element for a relatively short duration and/or over the course of multiple cycles to drive moisture out of the electrically-insulative material without generating sufficient leakage current to cause a GFCI trip.

Further, in the illustrated embodiment, a cooking element drying operation activates an electrical cooking element in such a matter that the surface temperature of the cooking element is maintained below a temperature that could cause a skin burn to occur or could present a risk of igniting, melting, deforming, or otherwise damaging any material in contact with the electrical cooking element. In some embodiments therefore a cooking element drying operation could be performed autonomously and/or while the cooking appliance is unattended.

Figure 6:
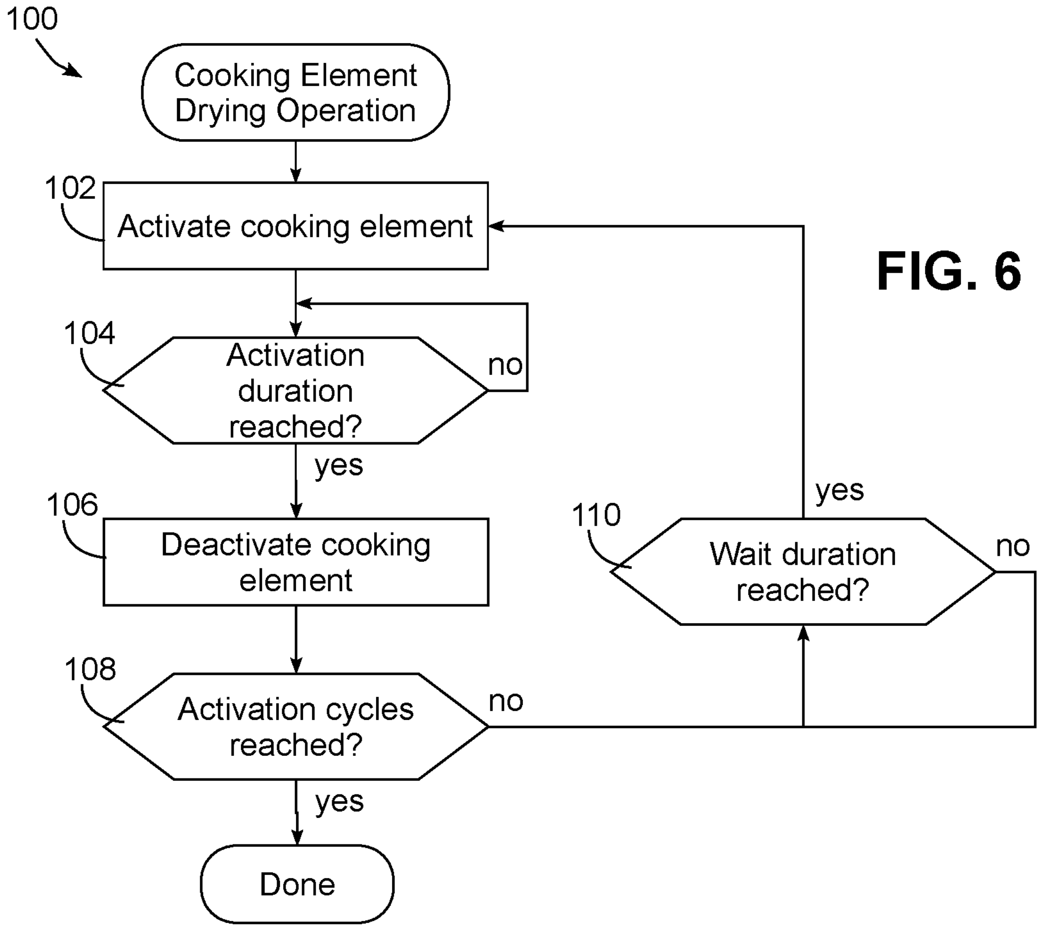
FIG. 6 is a flowchart illustrating an example sequence of operations for performing a cooking element drying operation using the cooking appliance of FIG. 1 or the cooking appliance of FIG. 2.

FIG. 6, for example, illustrates one example sequence of operations 100 for performing a cooking element drying operation for a single electrical cooking element, e.g., one of cooking elements 70, 90 of FIGS. 3-5. In sequence 100, the cooking element drying operation may be performed over the course of X activation cycles, with each cycle including an activation duration $D_A$ during which the electrical cooking element is activated and thus being heated and a wait duration $D_W$ during which the electrical cooking element is deactivated and thus cooling.

Sequence 100 begins in block 102 by activating the cooking element, and block 104 waits until the activation duration $D_A$ is reached. Once the activation duration is reached, control passes to block 106 to deactivate the cooking element, and block 108 determines if the number of activation cycles has been reached (i.e., if the number of cycles performed=X). If not, control passes to block 110 to wait until the wait duration $D_W$ is reached. Once the wait duration is reached, another activation cycle is initiated and control returns to block 102 to activate the cooking element. Returning to block 108, once the desired number of activation cycles have been performed, sequence 100 is complete.

It will be appreciated that the number of activation cycles, the activation duration and the wait duration may vary in different embodiments, e.g., based upon the configuration of the electrical cooking element, the type of electrically-insulative material, the amount of time since the electrical cooking element was used, the amount of moisture (which may be predicted or sensed in different embodiments), or other factors. Moreover, it will be appreciated that the activation duration and/or wait duration may vary from cycle to cycle, or from operation to operation. Further, any of the aforementioned variables may be dynamically varied during a cooking element drying operation, e.g., in response to sensor input (e.g., a temperature sensor or leakage current sensor). In other embodiments, however, a cooking element drying operation may be purely time-based and static, and may utilize a preprogrammed set of variables each and every time it is performed. By doing so, the cooking element drying operation may be implemented without actually sensing leakage current in the electrical cooking element.

In some embodiments, for example, an electrical cooking element may be activated for one second or less each cycle, or in some instances, only a small fraction of a second, given that the trip time for many GFCI breakers is about one second for a moderate leakage current. In addition, wait durations between cycles may be from about 2 seconds to about 60 seconds in some embodiments to allow for some cooling of the electrical cooking element. In addition, in some embodiments it may be desirable to configure a cooking element drying operation to maintain a surface temperature of the cooking element below a burning temperature threshold, which in some embodiments may be below about 84 degrees Celsius, and in some instances, below about 55 degrees Celsius. In some embodiments, the activation duration may progressively increase from cycle to cycle, e.g., starting with an activation duration of about 0.1 seconds when leakage current is potentially highest, and then progressively increasing the duration as the electrical cooking element warms up, moisture is driven out of the element, and the leakage current drops.

In addition, in some embodiments, where a cooking appliance includes multiple electrical cooking elements, cooking element drying operations may be performed for all or at least some of those electrical cooking elements concurrently, e.g., such that subsets of one or more of the electrical cooking elements are activated in an alternating sequence, thereby enabling non-activated electrical cooking elements to cool while other electrical cooking elements are activated. In some embodiments, for example, electrical cooking elements may be activated one-by-one, i.e., sequentially and individually, over the course of multiple cycles, thereby enabling N cooking elements, for example, to be activated for 1/N of the time for each cycle while being inactive and thus cooling for (N−1)/N of the time.

Figure 7:
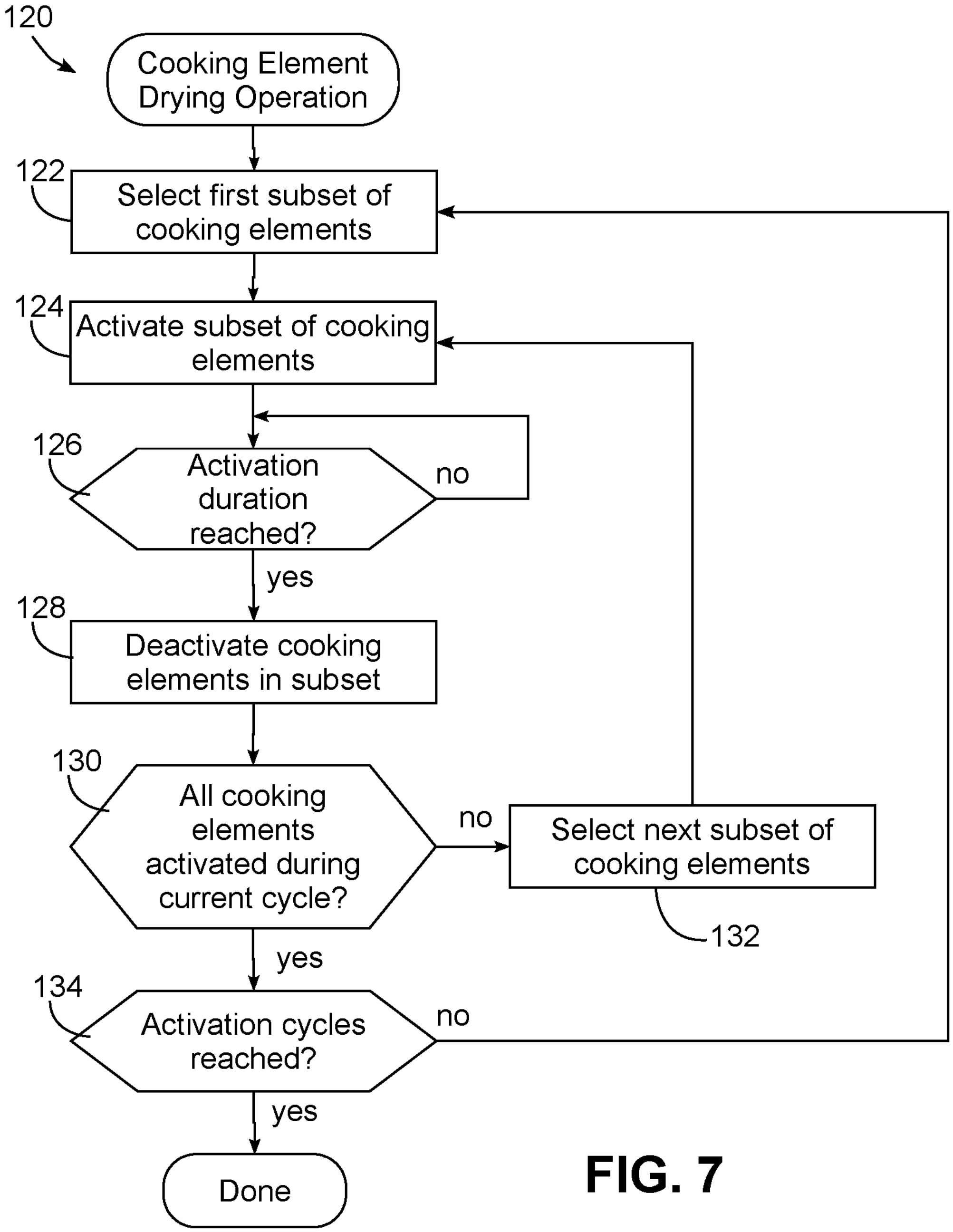
FIG. 7 is a flowchart illustrating another example sequence of operations for performing a cooking element drying operation using the cooking appliance of FIG. 1 or the cooking appliance of FIG. 2.

FIG. 7, for example, illustrates one example sequence of operations 120 for performing a cooking element drying operation for multiple electrical cooking elements. In sequence 120, the cooking elements are grouped into subsets of one or more cooking elements, and the cooking element drying operation may be performed over the course of X activation cycles, with each cycle including an activation duration $D_A$ during which each subset of electrical cooking elements is activated. The subsets may be based on cooking element type in some embodiments (e.g., the cooktop cooking elements in one subset and the oven cooking elements in another subset), although the invention is not so limited. Moreover, while in some embodiments a wait duration may be including between different subsets or at other times (e.g., at the end of each cycle) in a cooking element drying operation, in the illustrated embodiment no additional wait duration is included, so the amount of time each subset of cooking elements is deactivated is equivalent to the summed amount of time the other subsets of cooking elements are activated in each cycle.

Sequence 120 begins in blocks 122 and 124 by selecting and activating the first subset of cooking elements, and block 126 waits until the activation duration $D_A$ is reached. Once the activation duration is reached, control passes to block 128 to deactivate the subset of cooking elements, and block 130 determines if all of the cooking elements associated with the cooking element drying operation have been activated during the current cycle. If not, control passes to block 132 to select the next subset of cooking elements, and then back to block 124 to activate the next subset of cooking elements.

Returning to block 130, once all subsets of cooking elements have been activated in the current cycle, control passes to block 134 to determine if the number of activation cycles has been reached (i.e., if the number of cycles performed=X). If not, control passes to block 122 to initiate another activation cycle and again select the first subset of cooking elements. Returning to block 134, once the desired number of activation cycles have been performed, sequence 120 is complete. In addition to the variations discussed above in connection with sequence 100, sequence 120 may vary in additional ways, e.g., in the grouping of cooking elements into subsets from cycle to cycle, in the ordering of subsets from cycle to cycle, and other manners that will be appreciated by those of ordinary skill having the benefit of the instant disclosure.

In one non-limiting example cooking element drying operation performed on a cooking appliance with four cooktop electrical cooking elements and bake and broil oven electrical cooking elements, each cooking element may be activated for about 0.5 seconds individually, such that in 3 seconds, each cooking element is active for about 0.5 seconds and is inactive (and thus cooling) for about 2.5 seconds. Moreover, this sequence may be repeated multiple times, e.g., such that if it is desired to activate each cooking element for a total of about 60 seconds, the cooking element drying operation would have a total duration of about 6 minutes, consisting of 120 3-second cycles. It will be appreciated, however, that longer or shorter durations could be used in other embodiments, and further, that additional delays may be incorporated into each cycle.

Figure 8:
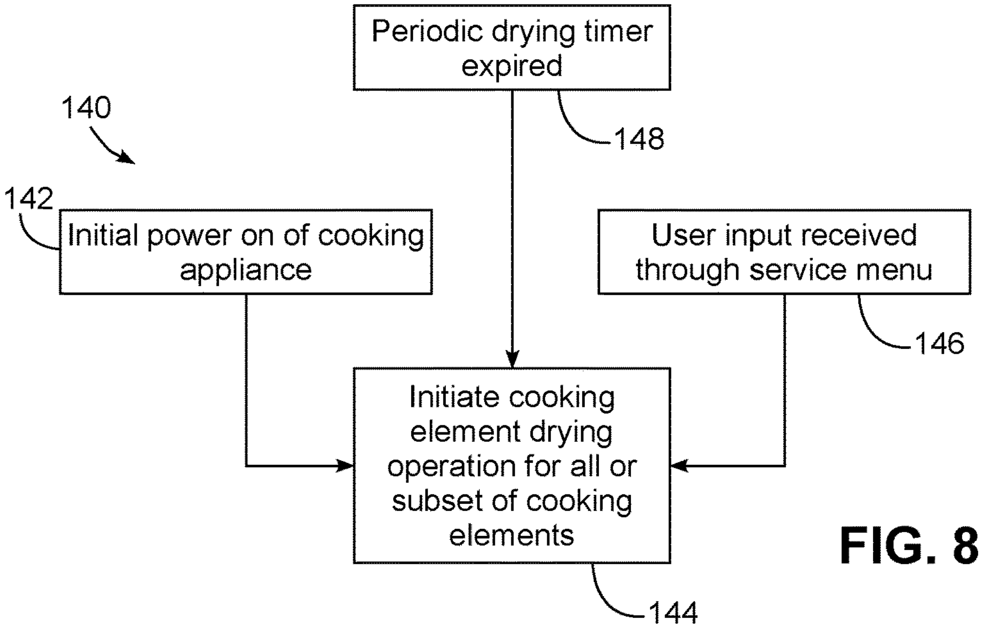
FIG. 8 is a flowchart illustrating a number of example triggers for initiating a cooking element drying operation using the cooking appliance of FIG. 1 or the cooking appliance of FIG. 2.

Now turning to FIG. 8, it will be appreciated that a cooking element drying operation may be performed at a number of different times in different embodiments, as well as in response to a number of different triggers. For example, as illustrated in block 142, the initial power on of a cooking appliance may be used to trigger initiation of a cooking element drying operation for all or a subset of cooking elements (block 144, which may initiate sequence 100 of FIG. 6 or sequence 120 of FIG. 7 in some embodiments). The initial power on may be considered in some embodiments to be when electrical power is initially supplied to the cooking appliance, while in other embodiments, the initial power on may occur only a single time after manufacture, such that once the initial power on occurs and a cooking element drying operation is performed, a flag is set in the controller such that a cooking element drying operation will not be performed each and every time the power goes out at the installation location of the cooking appliance.

Performing the cooking element drying operation in response to an initial power on may be useful to account for the potential that the cooking appliance has been stored in a warehouse and/or shipped by truck or ship for several weeks or months, potentially in humid conditions where the likelihood of moisture absorption is high and where the cooking appliance has not been operated to an extent that would cause moisture to be driven out through regular use of the cooking elements. In some embodiments, such a cooking element drying operation may be performed automatically and without notification to a user, while in other embodiments, such a cooking element drying operation may be initiated only after receiving user input, e.g., in response to a message presented on a user interface requesting permission to start the cooking element drying operation. In some embodiments, a user may also be notified that a cooking element drying operation is being performed, and in some instances, the progress thereof (e.g. using a countdown timer). It may also be desirable to notify the user that the cooking elements may be warm during the operation so that the user is not surprised by warm cooking elements and/or so the user can remove any items that are touching the cooking elements. In many cases, a cooking element drying operation performed in response to an initial power on will be performed on all cooking elements, although the invention is not so limited.

As also illustrated in FIG. 8, another trigger for initiating a cooking element drying operation is user input (block 146), e.g., as might be received through a service menu or other user-selectable option. Such manual initiation may be performed by a user whenever desired, and may in some instances be performed only on a subset of the cooking elements, e.g., as selected by a user. It may be desirable, for example, for a user to manually initiate a cooking element drying operation at the direction of online customer service as a part of a guided troubleshooting procedure.

As also illustrated in FIG. 8, yet another trigger for initiating a cooking element drying operation is expiration of a periodic drying timer (block 148), e.g., as a part of a regularly-scheduled maintenance activity for the cooking appliance. In some embodiments, for example, a cooking element drying operation may be performed at regular time intervals (e.g., every 30 days) to inhibit moisture build-up in the electrically-insulative material of the electrical heating element.

Figure 9:
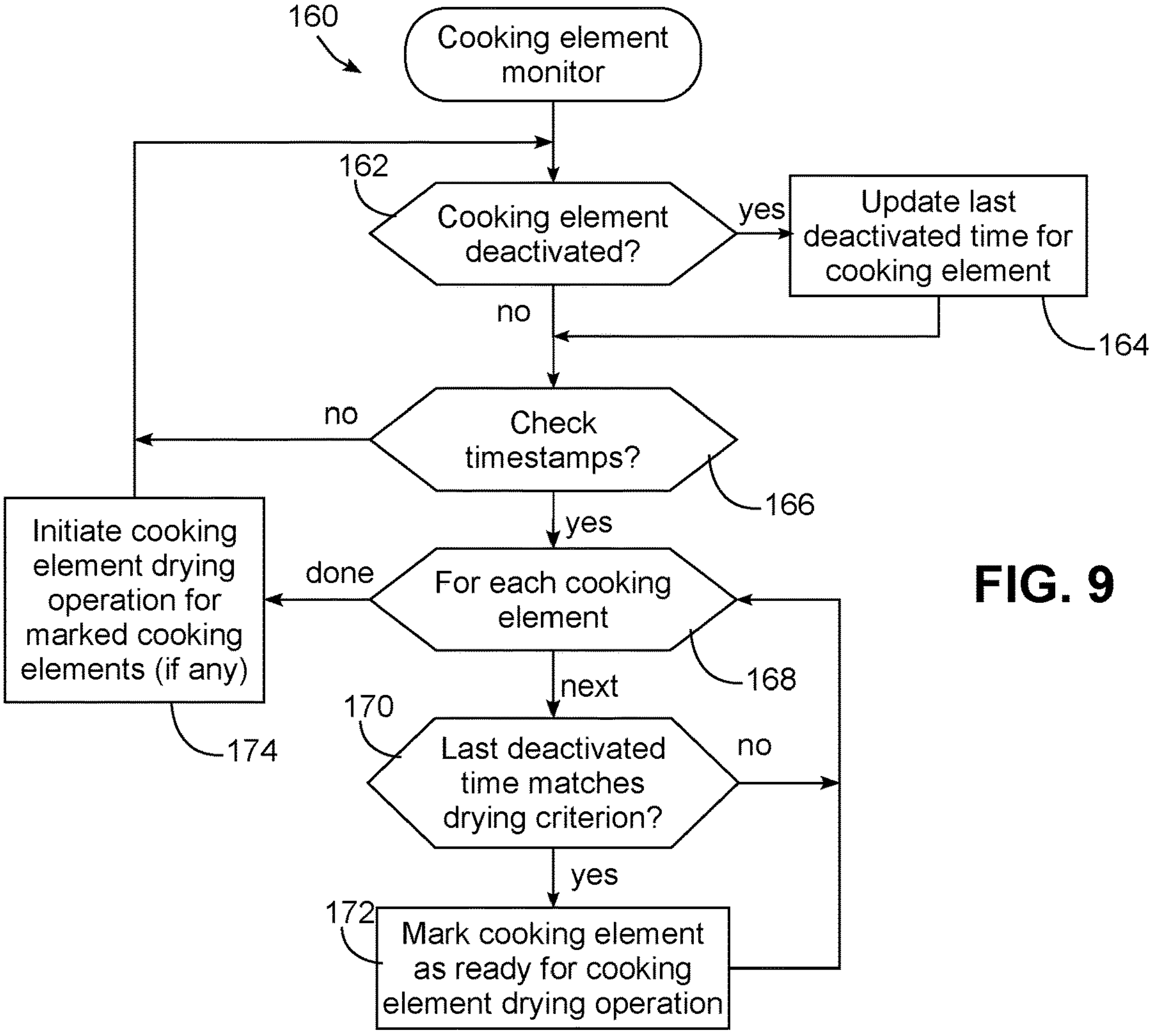
FIG. 9 is a flowchart illustrating an example sequence of operations for performing a cooking element monitoring operation using the cooking appliance of FIG. 1 or the cooking appliance of FIG. 2.

As yet another alternative, cooking element drying operations may also be triggered based upon monitored usage of a cooking appliance. FIG. 9, for example, illustrates a cooking element monitor sequence of operations 160 that may be used to track the usage of cooking elements and to automatically initiate cooking element drying operations for cooking elements that have not been used recently, i.e., where non-use of an electrical cooking element is found to meet a predetermined threshold (e.g., where a cooking element hasn't been used for 30 days). Such monitoring may be useful, for example, in situations where a cooking appliance is used infrequently (e.g., in vacation or second homes) or where particular cooking elements are not used frequently by a particular user.

Sequence 160 handles both the logging of cooking element usage and the detection of when cooking element drying operations should be initiated. Block 162, for example, detects whenever a cooking element has been deactivated or shut off. Whenever such an event occurs, block 162 passes control to block 164 to update a timestamp for the cooking element, representing the last deactivated time for the cooking element. In the alternative, other usage data about a cooking element may be tracked, e.g., timestamps when cooking elements are activated and/or how long cooking elements are activated.

While in some embodiments, timestamps may be checked during every iteration of sequence 160, in the illustrated embodiment, block 164 determines whether it is desirable to check the timestamps of all of the cooking elements to determine if any are in need of a cooking element drying operation. It may be desirable in some embodiments, for example, to check the timestamps once an hour, once a day, once a week, etc., and in some instances, to do so at a time when the cooking appliance is not likely to be in use, such that cooking element drying operations may be performed automatically and non-obtrusively on any cooking elements that have not been used in some period of time. Different time periods may be used in other embodiments, and in some embodiments, monitoring may be used to only suggest performance of a cooking element drying operation, with positive user input still used to initiate the operation.

As such, if it is time to check timestamps, control passes to block 168 to initiate a FOR loop to check each cooking element timestamp. Block 170 determines if the timestamp matches a drying criterion (e.g., if the timestamp is greater than 7 days old), and if so, passes control to block 172 to mark that cooking element as ready for a cooking element drying operation, and control returns to block 168 to check the next cooking element. If not, block 172 is bypassed and control returns directly to block 168. Then, once all cooking elements have been checked, block 168 then passes control to block 174 to initiate a cooking element drying operation for any marked cooking elements, or to do nothing if no cooking elements have been marked. Control then returns to block 162.

In at least some of the foregoing embodiments, cooking element drying operations are performed by activating an electrical cooking element in substantially the same manner as the electrical cooking element is activated during a normal operation (i.e., during cooking operations). For example, activation of an electrical cooking element may be made at the same voltage and/or power regardless of whether a cooking or cooking element drying operation is being performed. In other embodiments, however, the voltage and/or power supplied to the electrical cooking element during a cooking element drying operation may be reduced relative to that supplied during a cooking operation, thereby enabling the electrical cooking element to be heated more slowly for a relatively longer duration with a reduced risk of GFCI tripping. As an illustrative example, if an electrical cooking element had 24 kΩ (24,000 Ohms) of resistance from 120V (120 Volts) to Ground, it would result in 5 mA (5 milliamperes) of leakage current, which would most likely trip a GFCI circuit in less than 1 second. On the other hand, if only 36V was applied to the same electrical cooking element, the leakage current would likely be much smaller, e.g., about 1.5 mA, which would provide moderate heating to drive out moisture, and potentially without needing to perform multiple cycles in a cooking element drying operation to avoid tripping the GFCI at all.

Similarly, rather than simply applying a lower voltage to an electrical cooking element during a cooking element drying operation, an electrical cooking element may be controlled by a high-speed switching circuit and activated with a high frequency duty cycle to reduce an effective voltage supplied to the electrical cooking element during the cooking element drying operation. While the same actual voltage may be applied to the electrical cooking element, the effective voltage would be reduced as a result of the high speed switching.

As such, it will be appreciated that in block 102 of FIG. 6, and in block 124 of FIG. 7, the activation of an electrical cooking element in some embodiments may incorporate an actual or effective voltage reduction as compared to the voltage used to activate the cooking element during a cooking operation. Suitable circuitry for reducing the actual or effective voltage supplied to an electrical cooking element in this manner would be well within the skillset of those of ordinary skill in the art having the benefit of the instant disclosure, and it will be appreciated that such a reduction in actual or effective voltage reduction may be performed for an electrical cooking element in connection with a single activation cycle in some embodiments, or alternatively combined with the other various techniques and combinations of activation cycles, activation durations and/or wait durations described herein.

It will be appreciated that various modifications may be made to the embodiments discussed herein, and that a number of the concepts disclosed herein may be used in combination with one another or may be used separately. Therefore, the invention lies in the claims hereinafter appended.

What is claimed is:

1. A cooking appliance, comprising:

a housing;

a cooktop disposed on an upwardly facing surface of the housing;

an oven cavity disposed within the housing;

a plurality of cooktop electrical cooking elements disposed on the cooktop, each cooktop electrical cooking element comprising a heater core extending through a sheath and electrically insulated from the sheath by an electrically-insulative powder;

a plurality of oven electrical cooking elements positioned to generate heat within the oven cavity, each oven electrical cooking element comprising a heater core extending through a sheath and electrically insulated from the sheath by an electrically-insulative powder; and a controller coupled to the plurality of cooktop electrical cooking elements and the plurality of oven electrical cooking elements, wherein the controller is configured to selectively activate one or more of the plurality of cooktop electrical cooking elements during a cooktop cooking operation and to selectively activate one or more of the plurality of oven electrical cooking elements during an oven cooking operation, and wherein the controller is further configured to perform a cooking element drying operation that sequentially and individually activates each of the plurality of cooktop electrical cooking elements and the plurality of oven electrical cooking elements one or more times each while maintaining a surface temperature of each of the plurality of cooktop electrical cooking elements and plurality of oven electrical cooking elements below a burning temperature threshold to drive moisture out of each of the plurality of cooktop electrical cooking elements and the plurality of oven electrical cooking elements, wherein the burning threshold temperature is less than a predetermined temperature that causes a skin burn to occur or presents a risk of igniting, melting, deforming, or damaging any material in contact with the electrical cooking element;

wherein the controller is configured to perform the cooking element drying operation at regular time intervals and without sensing leakage current in the plurality of cooktop electrical cooking elements and the plurality of oven electrical cooking elements to inhibit moisture build-up in the plurality of cooktop electrical cooking elements and the plurality of oven electrical cooking elements.

2. A cooking appliance, comprising:

an electrical cooking element configured to generate heat in response to electrical current, the electrical cooking element comprising a heater core extending through a sheath and electrically insulated from the sheath by an electrically-insulative material; and a controller coupled to the electrical cooking element and configured to activate the electrical cooking element during a cooking operation to generate heat, wherein the controller is further configured to perform a cooking element drying operation that activates the electrical cooking element to drive moisture out of the electrically-insulative material of the electrical cooking element;

wherein the controller is configured to monitor usage of the electrical cooking element during use of the cooking appliance by tracking usage data for the electrical cooking element, and wherein the controller is configured to perform the cooking element drying operation without sensing leakage current in the electrical cooking element and in response to the monitored usage by performing the cooking element drying operation in response to determining that the tracked usage data meets a predetermined drying criterion.

3. The cooking appliance of claim 2, wherein the controller is configured to perform the cooking element drying operation by cycling the electrical cooking element one or more times while maintaining a surface temperature of the electrical cooking element below a burning threshold temperature, wherein the burning threshold temperature is less than a predetermined temperature that causes a skin burn to occur or presents a risk of igniting, melting, deforming, or damaging any material in contact with the electrical cooking element.

4. The cooking appliance of claim 3, wherein the burning threshold temperature is less than about 84 degrees Celsius.

5. The cooking appliance of claim 2, wherein the controller is configured to perform the cooking element drying operation by cycling the electrical cooking element for less than about one second per cycle.

6. The cooking appliance of claim 2, wherein the controller is configured to activate the electrical cooking element during a cooking operation at a first voltage, and to perform the cooking element drying operation by activating the electrical cooking element at a second voltage that is lower than the first voltage.

7. The cooking appliance of claim 2, wherein the controller is configured to perform the cooking element drying operation by activating the electrical cooking element with a high frequency duty cycle to reduce an effective voltage supplied to the electrical cooking element during the cooking element drying operation.

8. The cooking appliance of claim 2, wherein the electrical cooking element is a first electrical cooking element among a plurality of electrical cooking elements, and wherein the controller is configured to perform the cooking element drying operation by sequentially cycling each of the plurality of electrical cooking elements one or more times each.

9. The cooking appliance of claim 8, wherein the controller is configured to individually activate each of the plurality of electrical cooking elements by itself when sequentially cycling each of the plurality of electrical cooking elements one or more times each.

10. The cooking appliance of claim 2, wherein the cooking element drying operation is a first cooking element drying operation, and wherein the controller is further configured to perform a second cooking element drying operation in response to initial power on of the cooking appliance upon installation and without sensing leakage current in the electrical cooking element.

11. The cooking appliance of claim 2, wherein the cooking element drying operation is a first cooking element drying operation, and wherein the controller is further configured to perform a second cooking element drying operation in response to user input separate from activating the electrical cooking element and without sensing leakage current in the electrical cooking element.

12. The cooking appliance of claim 11, wherein the user input is received through a service menu.

13. The cooking appliance of claim 2, wherein the cooking element drying operation is a first cooking element drying operation, and wherein the controller is further configured to perform a second cooking element drying operation at regular time intervals and without sensing leakage current in the electrical cooking element to inhibit moisture build-up in the electrically-insulative material of the electrical cooking element.

14. The cooking appliance of claim 2, wherein the usage data includes a timestamp indicating when the electrical cooking element was last deactivated.

15. The cooking appliance of claim 14, wherein the predetermined drying criterion is based on a comparison of the timestamp with a predetermined duration.

16. The cooking appliance of claim 2, wherein the electrical cooking element is a first electrical cooking element among a plurality of electrical cooking elements, wherein the controller is configured to monitor usage of each of the plurality of electrical cooking elements during use of the cooking appliance by monitoring activation and/or deactivation of each of the plurality of electrical cooking elements, and wherein the controller is configured to determine from the monitored activation and/or deactivation of each of the plurality of electrical cooking elements a subset of the plurality of electrical cooking elements that meet a predetermined drying criterion and perform the cooking element drying operation for only the determined subset of the plurality of electrical cooking elements and without sensing leakage current in the subset of the plurality of electrical cooking elements.

17. The cooking appliance of claim 2, wherein the electrically-insulative material comprises a magnesium oxide powder.

18. The cooking appliance of claim 2, further comprising:

a housing; and a cooktop disposed in the housing, wherein the electrical cooking element is a cooktop electrical cooking element disposed on the cooktop.

19. The cooking appliance of claim 2, further comprising:

a housing; and an oven cavity, wherein the electrical cooking element is an oven electrical cooking element configured to supply heat to the oven cavity.

20. A method of operating a cooking appliance, the method comprising:

monitoring usage of an electrical cooking element during use of the cooking appliance by tracking usage data for the electrical cooking element, the usage data including activation and/or deactivation of the electrical cooking element, the electrical cooking element configured to generate heat in response to electrical current and comprising a heater core extending through a sheath and electrically insulated from the sheath by an electrically-insulative material; and performing a cooking element drying operation that activates the electrical cooking element to drive moisture out of the electrically-insulative material of the electrical cooking element without sensing leakage current in the electrical cooking element and in response to the monitored usage by performing the cooking element drying operation in response to determining that the tracked usage data meets a predetermined drying criterion.

* * * * *